(12) United States Patent
Li et al.

(10) Patent No.: US 11,122,218 B2
(45) Date of Patent: *Sep. 14, 2021

(54) PROCESSING AND FORMATTING VIDEO FOR INTERACTIVE PRESENTATION

(71) Applicant: Snap Inc., Santa Monica, CA (US)

(72) Inventors: Jia Li, Marina Del Rey, CA (US); Nathan Litke, Venice, CA (US); Jose Jesus (Joseph) Paredes, Glendale, CA (US); Rahul Bhupendra Sheth, Los Angeles, CA (US); Daniel Szeto, Los Angeles, CA (US); Ning Xu, Irvine, CA (US); Jianchao Yang, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/722,721

(22) Filed: Dec. 20, 2019

(65) Prior Publication Data
US 2020/0128194 A1    Apr. 23, 2020

Related U.S. Application Data

(63) Continuation of application No. 15/201,049, filed on Jul. 1, 2016, now Pat. No. 10,623,662.

(51) Int. Cl.
*H04N 5/93* (2006.01)
*H04N 5/262* (2006.01)
(Continued)

(52) U.S. Cl.
CPC ....... *H04N 5/2628* (2013.01); *G06K 9/00718* (2013.01); *G06K 9/6212* (2013.01)

(58) Field of Classification Search
CPC .... H04N 5/2628; H04N 5/225; H04N 19/167; H04N 21/23418; H04N 5/262;
(Continued)

(56) References Cited

U.S. PATENT DOCUMENTS

| 6,038,295 A | 3/2000 | Mattes |
| 6,980,909 B2 | 12/2005 | Root et al. |

(Continued)

FOREIGN PATENT DOCUMENTS

| CA | 2887596 A1 | 7/2015 |
| CN | 110089117 A | 8/2019 |

(Continued)

OTHER PUBLICATIONS

"U.S. Appl. No. 15/201,049, Examiner Interview Summary dated Jan. 26, 2018", 3 pgs.

(Continued)

*Primary Examiner* — Robert Chevalier
(74) *Attorney, Agent, or Firm* — Schwegman Lundberg & Woessner, P.A.

(57) ABSTRACT

Systems and methods are described for determining that the user interaction with a display of a computing device during display of a video comprising a sequence of frames indicates a region of interest in a current frame of the sequence of frames of the displayed video. For each frame of the sequence of frames after the current frame, the frame is cropped to generate a cropped frame comprising a portion of the frame including the region of interest in the frame, the cropped frame is enlarged based on a display size corresponding to an angle or orientation of the computing device during display of the video, and the enlarged cropped frame replaces the frame such that the enlarged cropped frame is displayed in the sequence of frames of the video on the display of the computing device instead of the frame.

20 Claims, 12 Drawing Sheets

(51) Int. Cl.
*G06K 9/00* (2006.01)
*G06K 9/62* (2006.01)

(58) Field of Classification Search
CPC .... G06K 9/00718; G06K 9/46; G06K 9/4642; G06K 9/6212; G06K 9/62; G06K 9/20; G06K 9/00; G11B 27/02
USPC ..... 386/280, 278; 382/190, 195; 375/240.08
See application file for complete search history.

(56) References Cited

U.S. PATENT DOCUMENTS

| | | | |
|---|---|---|---|
| 7,071,970 | B2 | 7/2006 | Benton |
| 7,173,651 | B1 | 2/2007 | Knowles |
| 7,411,493 | B2 | 8/2008 | Smith |
| 7,535,890 | B2 | 5/2009 | Rojas |
| 8,131,597 | B2 | 3/2012 | Hudetz |
| 8,199,747 | B2 | 6/2012 | Rojas et al. |
| 8,332,475 | B2 | 12/2012 | Rosen et al. |
| 8,718,333 | B2 | 5/2014 | Wolf et al. |
| 8,724,622 | B2 | 5/2014 | Rojas |
| 8,754,941 | B1 | 6/2014 | Sarwari et al. |
| 8,774,517 | B1* | 7/2014 | Khosla .................. G06K 9/629 382/190 |
| 8,874,677 | B2 | 10/2014 | Rosen et al. |
| 8,909,679 | B2 | 12/2014 | Root et al. |
| 8,995,433 | B2 | 3/2015 | Rojas |
| 9,040,574 | B2 | 5/2015 | Wang et al. |
| 9,055,416 | B2 | 6/2015 | Rosen et al. |
| 9,100,806 | B2 | 8/2015 | Rosen et al. |
| 9,100,807 | B2 | 8/2015 | Rosen et al. |
| 9,191,776 | B2 | 11/2015 | Root et al. |
| 9,204,252 | B2 | 12/2015 | Root |
| 9,275,683 | B1 | 3/2016 | Hundemer et al. |
| 9,443,227 | B2 | 9/2016 | Evans et al. |
| 9,489,661 | B2 | 11/2016 | Evans et al. |
| 9,491,134 | B2 | 11/2016 | Rosen et al. |
| 9,635,307 | B1* | 4/2017 | Mysore Vijaya Kumar ................ G06K 9/4642 |
| 9,659,380 | B1* | 5/2017 | Castellani ......... G06K 9/00718 |
| 9,723,258 | B2 | 8/2017 | Gates |
| 9,762,848 | B2 | 9/2017 | Nowakowski et al. |
| 9,762,938 | B2 | 9/2017 | Oyman |
| 10,475,483 | B2 | 11/2019 | Mourkogiannis et al. |
| 10,622,023 | B2 | 4/2020 | Li et al. |
| 10,623,662 | B2* | 4/2020 | Li ..................... G06K 9/00718 |
| 10,803,906 | B1 | 10/2020 | Mourkogiannis et al. |
| 2006/0047674 | A1 | 3/2006 | Visharam et al. |
| 2008/0084482 | A1* | 4/2008 | Hansson ................ H04N 5/272 348/218.1 |
| 2009/0248300 | A1 | 10/2009 | Dunko et al. |
| 2009/0251594 | A1 | 10/2009 | Hua et al. |
| 2011/0202598 | A1 | 8/2011 | Evans et al. |
| 2011/0228846 | A1* | 9/2011 | Eilat .................... G01S 3/7864 375/240.08 |
| 2012/0086725 | A1 | 4/2012 | Joseph et al. |
| 2012/0209924 | A1 | 8/2012 | Evans et al. |
| 2013/0050574 | A1 | 2/2013 | Lu et al. |
| 2013/0108175 | A1* | 5/2013 | Ptucha .................... G06T 11/60 382/199 |
| 2013/0127915 | A1 | 5/2013 | Gilra |
| 2013/0321313 | A1 | 12/2013 | Huang et al. |
| 2014/0022433 | A1 | 1/2014 | Glennie et al. |
| 2014/0071349 | A1 | 3/2014 | Ramo et al. |
| 2014/0098197 | A1 | 4/2014 | Geris et al. |
| 2014/0114190 | A1 | 4/2014 | Chiang et al. |
| 2014/0245367 | A1 | 8/2014 | Sasaki et al. |
| 2014/0307112 | A1 | 10/2014 | Sokeila et al. |
| 2015/0109408 | A1* | 4/2015 | Sharma ............. H04N 5/23293 348/39 |
| 2015/0156543 | A1 | 6/2015 | Allegretti et al. |
| 2015/0174477 | A1 | 6/2015 | Jackson et al. |
| 2015/0262420 | A1 | 9/2015 | Arun |
| 2015/0281300 | A1 | 10/2015 | Ganesh et al. |
| 2015/0326844 | A1 | 11/2015 | Celmins et al. |
| 2016/0005435 | A1 | 1/2016 | Campbell et al. |
| 2016/0005445 | A1 | 1/2016 | Jeong |
| 2016/0358628 | A1 | 12/2016 | Liu et al. |
| 2016/0365121 | A1 | 12/2016 | Decaprio |
| 2016/0366347 | A1 | 12/2016 | Shin et al. |
| 2016/0381111 | A1 | 12/2016 | Barnett et al. |
| 2017/0104928 | A1 | 4/2017 | Chase et al. |
| 2017/0187983 | A1 | 6/2017 | Lawrence |
| 2017/0236495 | A1 | 8/2017 | Braun et al. |
| 2017/0244986 | A1* | 8/2017 | Pinckernell ........ H04N 21/4728 |
| 2017/0272785 | A1 | 9/2017 | Jeong |
| 2018/0007286 | A1 | 1/2018 | Li et al. |
| 2018/0007444 | A1 | 1/2018 | Li et al. |
| 2018/0338111 | A1 | 11/2018 | Mourkogiannis et al. |
| 2020/0152238 | A1 | 5/2020 | Li et al. |
| 2020/0402542 | A1 | 12/2020 | Mourkogiannis et al. |

FOREIGN PATENT DOCUMENTS

| | | |
|---|---|---|
| WO | WO-2015197815 A1 | 12/2015 |
| WO | WO-2018005823 A1 | 1/2018 |

OTHER PUBLICATIONS

"U.S. Appl. No. 15/201,049, Examiner Interview Summary dated Jun. 12, 2019", 3 pgs.

"U.S. Appl. No. 15/201,049, Examiner Interview Summary dated Jun. 28, 2018", 3 pgs.

"U.S. Appl. No. 15/201,049, Examiner Interview Summary dated Jul. 27, 2017", 3 pgs.

"U.S. Appl. No. 15/201,049, Final Office Action dated Aug. 7, 2019", 22 pgs.

"U.S. Appl. No. 15/201,049, Final Office Action dated Oct. 17, 2018", 28 pgs.

"U.S. Appl. No. 15/201,049, Final Office Action dated Nov. 1, 2017", 21 pgs.

"U.S. Appl. No. 15/201,049, Non Final Office Action dated Mar. 7, 2019", 20 pgs.

"U.S. Appl. No. 15/201,049, Non Final Office Action dated Mar. 26, 2018", 20 pgs.

"U.S. Appl. No. 15/201,049, Non Final Office Action dated Apr. 20, 2017", 16 pgs.

"U.S. Appl. No. 15/201,049, Notice of Allowance dated Nov. 20, 2019", 11 pgs.

"U.S. Appl. No. 15/201,049, Response filed Jan. 16, 2019 to Final Office Action dated Oct. 17, 2018", 15 pgs.

"U.S. Appl. No. 15/201,049, Response filed Jan. 22, 2018 to Final Office Action dated Nov. 11, 2017", 13 pgs.

"U.S. Appl. No. 15/201,049, Response Filed Jun. 25, 2018 to Non Final Office Action dated Mar. 26, 2018", 17 pgs.

"U.S. Appl. No. 15/201,049, Response filed Jul. 20, 2017 to Non Final Office Action dated Apr. 20, 2017", 11 pgs.

"U.S. Appl. No. 15/201,049, Response filed Oct. 7, 2019 to Final Office Action dated Aug. 7, 2019", 17 pgs.

"U.S. Appl. No. 15/201,049, Response filed Jun. 7, 2019 to Non-Final Office Action dated Mar. 7, 2019", 15 pgs.

"U.S. Appl. No. 15/201,079, Examiner Interview Summary dated May 26, 2017", 3 pgs.

"U.S. Appl. No. 15/201,079, Examiner Interview Summary dated Jun. 5, 2018", 3 pgs.

"U.S. Appl. No. 15/201,079, Examiner Interview Summary dated Oct. 21, 2019", 4 pgs.

"U.S. Appl. No. 15/201,079, Examiner Interview Summary dated Nov. 9, 2017", 3 pgs.

"U.S. Appl. No. 15/201,079, Examiner Interview Summary dated Nov. 13, 2018", 3 pgs.

"U.S. Appl. No. 15/201,079, Final Office Action dated Aug. 21, 2019", 14 pgs.

"U.S. Appl. No. 15/201,079, Final Office Action dated Sep. 7, 2018", 14 pgs.

"U.S. Appl. No. 15/201,079, Final Office Action dated Sep. 22, 2017", 16 pgs.

(56) References Cited

OTHER PUBLICATIONS

"U.S. Appl. No. 15/201,079, Non Final Office Action dated Feb. 8, 2019", 15 pgs.
"U.S. Appl. No. 15/201,079, Non Final Office Action dated Feb. 23, 2018", 14 pgs.
"U.S. Appl. No. 15/201,079, Non Final Office Action dated Apr. 21, 2017", 13 pgs.
"U.S. Appl. No. 15/201,079, Response Filed May 8, 2018 to Non Final Office Action dated Feb. 23, 2018", 11 pgs.
"U.S. Appl. No. 15/201,079, Response filed Jun. 19, 2017 to Non Final Office Action dated Apr. 21, 2017", 10 pgs.
"U.S. Appl. No. 15/201,079, Response filed Oct. 11, 2019 to Final Office Action dated Aug. 21, 2019", 14 pgs.
"U.S. Appl. No. 15/201,079, Response filed Nov. 16, 2017 to Final Office Action dated Sep. 22, 2017", 11 pgs.
"U.S. Appl. No. 15/201,079, Response filed Nov. 7, 2018 to Final Office Action dated Sep. 7, 2018", 13 pgs.
"U.S. Appl. No. 15/201,079, Response filed May 7, 2019 to Non Final Office Action dated Feb. 8, 2019", 17 pgs.
"U.S. Appl. No. 15/597,006, Examiner Interview Summary dated Mar. 18, 2019", 3 pgs.
"U.S. Appl. No. 15/597,006, Non Final Office Action dated Nov. 23, 2018", 24 pgs.
"U.S. Appl. No. 15/597,006, Notice of Allowance dated Apr. 9, 2019", 15 pgs.
"U.S. Appl. No. 15/597,006, Notice of Allowance dated Jul. 8, 2019", 10 pgs.
"U.S. Appl. No. 15/597,006, Response fled Mar. 18, 2019 to Non Final Office Action dated Nov. 23, 2018", 11 pgs.
"International Application Serial No. PCT/US2017/040045, International Preliminary Report on Patentability dated Jan. 10, 2019", 12 pgs.
"International Application Serial No. PCT/US2017/040045, International Search Report dated Nov. 15, 2017", 6 pgs.
"International Application Serial No. PCT/US2017/040045, Invitation to Pay Add'l Fees and Partial Search Rpt dated Sep. 25, 2017", 12 pgs.
"International Application Serial No. PCT/US2017/040045, Written Opinion dated Nov. 15, 2017", 10 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
"U.S. Appl. No. 15/201,079, Notice of Allowance dated Dec. 5, 2019", 10 pgs.
"U.S. Appl. No. 16/653,586, Final Office Action dated Mar. 20, 2020", 10 pgs.
"U.S. Appl. No. 16/653,586, Non Final Office Action dated Nov. 19, 2019", 8 pgs.
"U.S. Appl. No. 16/653,586, Response filed Feb. 19, 2020 to Non Final Office Action dated Nov. 19, 2019", 9 pgs.
"U.S. Appl. No. 16/653,586, Notice of Allowance dated Jun. 4, 2020", 9 pgs.
"U.S. Appl. No. 16/653,586, Response filed May 20, 2020 to Final Office Action dated Mar. 20, 2020", 7 pgs.
"U.S. Appl. No. 16/743,563, Non Final Office Action dated Jul. 10, 2020", 29 pgs.
"U.S. Appl. No. 16/743,563, Examiner Interview Summary dated Oct. 16, 2020", 3 pgs.
"U.S. Appl. No. 16/743,563, Response filed Oct. 12, 2020 to Non Final Office Action dated Jul. 10, 2020", 11 pgs.
U.S. Appl. No. 16/948,229, filed Sep. 9, 2020, Recording and Playing Video Using Orientation of Device.
"U.S. Appl. No. 16/743,563, Notice of Allowance dated Mar. 11, 2021", 10 pgs.
"Chinese Application Serial No. 201780052373.5, Office Action dated Jan. 26, 2021", 2 pgs.
"Chinese Application Serial No. 202110311822.1, Notification to Make Rectification dated Apr. 16, 2021", w/English Translation, 2 pgs.
U.S. Appl. No. 15/201,049, filed Jul. 1, 2016, Processing and Formatting Video for Interactive Presentation.
U.S. Appl. No. 15/201,079, filed Jul. 1, 2016, Processing and Formatting Video for Interactive Presentation.
U.S. Appl. No. 16/743,563, filed Jan. 15 2020, Processing and Formatting Video for Interactive Presentation.
U.S. Appl. No. 15/597,006, filed May 16, 2017, Method and System for Recording and Playing Video Using Orientation of Device.
U.S. Appl. No. 16/653,586, filed Oct. 15, 2019, Recording and Playing Video Using Orientation of Device.
"Chinese Application Serial No. 201780052373.5, Response filed Mar. 24, 2021 to Office Action dated Jan. 26, 2021", w/English Claims, 10 pgs.
U.S. Appl. No. 17/303,817, filed Jun. 8, 2021, Processing and Formatting Video for Interactive Presentation.
"U.S. Appl. No. 16/948,229, Non Final Office Action dated Jun. 3, 2021", 8 pgs.
"Korean Application Serial No. 10-2019-7002913, Notice of Preliminary Rejection dated Apr. 24, 2021", w/ English translation, 11 pgs.

* cited by examiner

PROCESSING AND FORMATTING VIDEO FOR INTERACTIVE PRESENTATION

CLAIM FOR PRIORITY

This application is a continuation of and claims the benefit of priority of U.S. application Ser. No. 15/201,049, filed Jul. 1, 2016, which is hereby incorporated by reference in its entirety.

TECHNICAL FIELD

The present disclosure relates generally to a mechanism for processing and formatting video for interactive presentation.

BACKGROUND

Face-to-face communication is not always possible. Accordingly, various forms of communicating via video on a computing device, such as a mobile device or personal computer, are becoming more prevalent. Communicating and sharing video on a mobile device has various technical challenges to ensure a more seamless experience. For example, sharing and viewing landscape video on a mobile device when the device is oriented vertically may result in large black bars appearing on the top and bottom of the screen, and the video may be more difficult to view, particularly on a device with a smaller screen size. Moreover, interactive ways of presenting video content are lacking.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to processing and formatting video for interactive presentation. As explained above, there are various technical challenges to ensure a more seamless video communication experience. For example, sharing and viewing landscape video on a mobile device when the device is oriented vertically may result in large black bars appearing on the top and bottom of the screen and the video may be more difficult to view, particularly on a device with a smaller screen size. Moreover, interactive ways of presenting video content are lacking.

Embodiments described herein provide techniques for processing and formatting video for interactive presentation of video. Systems described herein may receive content messages comprising media content (e.g., photos, video, audio, text, etc.). The content messages may be sent by users via a computing device (e.g., mobile device, personal computer, etc.), or third party servers. The users may utilize an application on the computing device to produce content messages and/or receive content messages. A server system may receive tens of thousands of content messages (if not more) that may contain video, multimedia, or other content that may be processed by the server system to provide interactive ways of presenting the content.

For example, in one embodiment a computing device (e.g., server computer, client device, etc.) receives video comprising a plurality of frames and determines that the video should be processed and formatted for interactive presentation. For example, the computing device may determine that vertical cropping should be performed. The computing device may analyze each frame of the plurality of frames to determine a region of interest in each frame, and crop each frame based on the region of interest in each frame. The computing device may smooth a trajectory between the preceding frame and the current frame.

In another example embodiment, a computing device may receive a plurality of video sources. The computing device may analyze the video sources to determine a device orientation to associate with each video source, associate the device orientation with each video source, and store the video sources and associated orientation. The computing device may detect the device orientation, determine the video source associated with the device orientation, and provide the video source associated with the device orientation.

In yet another example embodiment, a computing device may receive a plurality of video sources. The computing device may analyze the video sources to determine a region or object to associate with each video source, associate the region or object with each video source, and store the video sources and associated region or object. The computing device may detect a user input indicating a selection of a region or object, determine the video source associated with the region or object, and provide the video source associated with the region or object.

Figure 1:
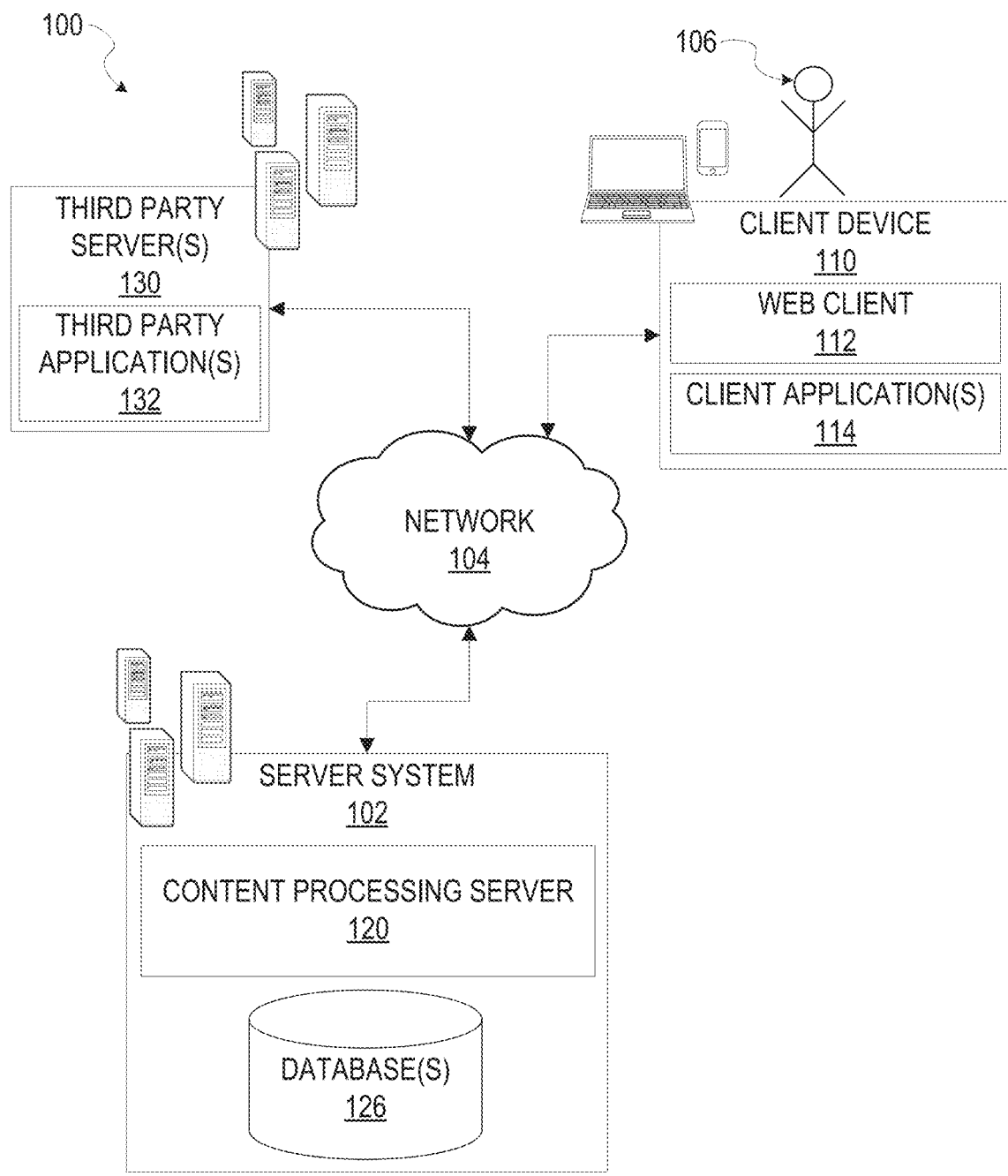
FIG. 1 is a block diagram illustrating a networked system, according to some example embodiments, to process and format video for interactive presentation.

FIG. 1 is a block diagram illustrating a networked system 100, according to some example embodiments, configured to process and format video for interactive presentation. The system 100 may include one or more client devices such as client device 110. The client device 110 may comprise, but is not limited to, a mobile phone, desktop computer, laptop, portable digital assistant (PDA), smart phone, tablet, ultra book, netbook, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to send and receive content messages (e.g., comprising photos, video, audio, text, etc.), search and display content messages, view and participate in media collections comprising media content from content messages, and the like. In one embodiment, the system 100 is a media content processing and optimization system to process and format media content for interactive presentation.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110, and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more applications 114 (also referred to as "apps") such as, but not limited to, a web browser, messaging application, electronic mail (email) application, e-commerce site application, mapping or location application, content production and editing application, and the like. In some embodiments, one or more applications 114 may be included in a given one of the client device 110, and configured to locally provide the user interface and at least some of the functionalities with the application 114 configured to communicate with other entities in the system 100 (e.g., third party servers 130, server system 102, etc.), on an as needed basis, for data and/or processing capabilities not locally available (e.g., to access content messages, process media content, route content messages, authenticate a user 106, verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include a content processing server 120 that may be communicatively coupled with one or more databases 126. Databases 126 may be storage devices that store information such as content messages, processed content messages, and the like.

The content processing server 120 may provide functionality to perform video processing and formatting for interactive presentation, as an example. The content processing server 120 may access one or more databases 126 to retrieve stored data to use in processing and formatting video and to store processed and formatted video. The server system 102 may receive content messages comprising media content from a plurality of users 106 and may process the content messages and send the content messages to a plurality of users 106, add the content messages to one or more media collections for viewing by one or more users 106, or otherwise make the content messages or media content from the content messages available to one or more users 106.

The system 100 may further include one or more third party servers 130. The one or more third party servers 130 may include one or more third party application(s) 132. The one or more third party application(s) 132, executing on third party server(s) 130, may interact with the server system 102 via content processing server 120. For example, one or more the third party applications 132 may request and utilize information from the server system 102 via the content processing server 120 to support one or more features or functions on a website hosted by the third party or an application hosted by the third party. The third party website or application 132, for example, may generate or provide video, multimedia, and other content (e.g., professional videos, advertisements, etc.) that are supported by relevant functionality and data in the server the system 102. The video, multimedia, and other content generated or provided by the third party servers 130 may be processed by the server system 102 (e.g., via content processing server 120), and the processed content may be made available for viewing by one or more users 106 (e.g., via a client application 114, a third party application 132, or other means).

Figure 2:
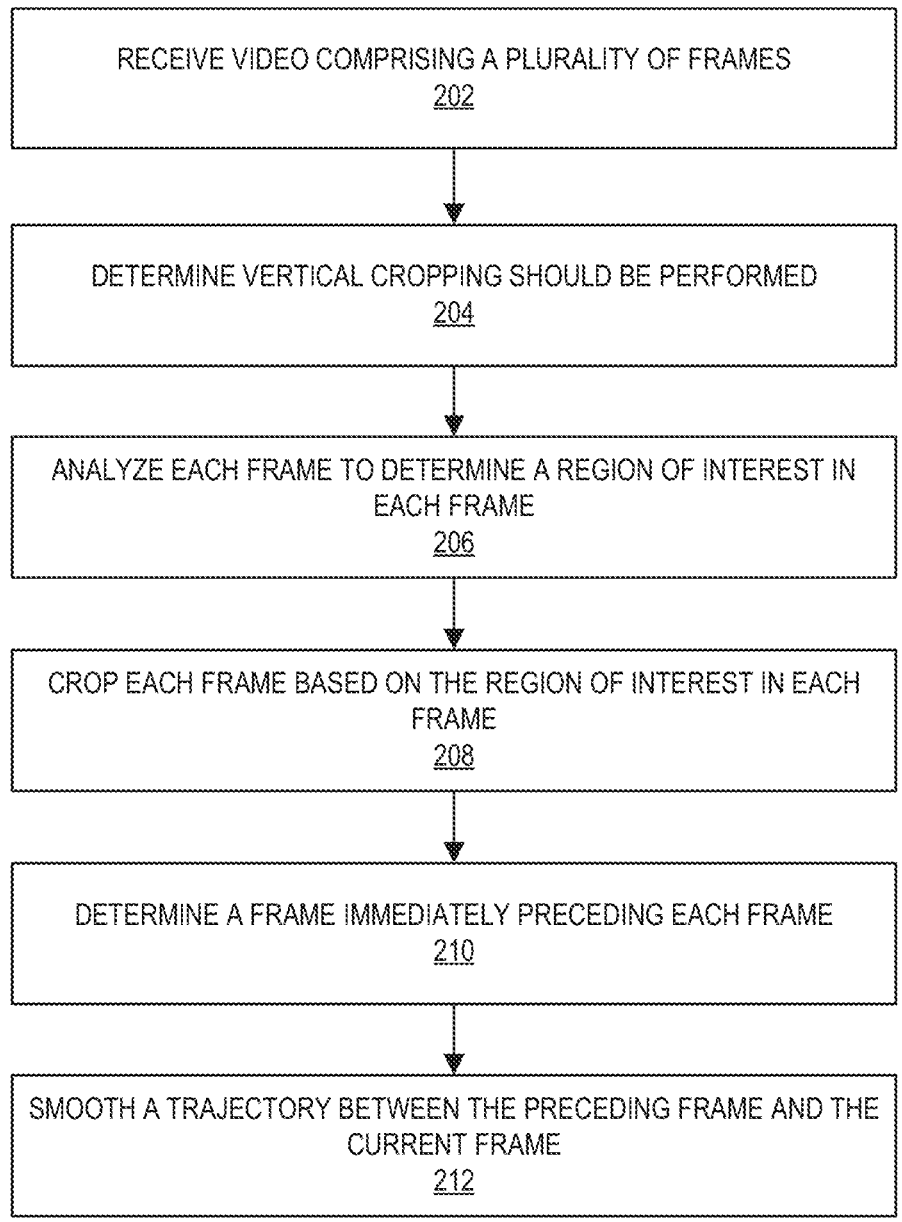
FIG. 2 is a flowchart illustrating aspects of a method, according to some example embodiments, for processing and formatting video for interactive presentation.

FIG. 2 is a flow chart illustrating aspects of a method 200, according to some example embodiments, for processing and formatting video for interactive presentation. For illustrative purposes, method 200 is described with respect to the networked system 100 of FIG. 1. It is to be understood that method 200 may be practiced with other system configurations in other embodiments.

As explained above, the server system 102 may receive a plurality of content messages to be processed and made available to one or more users 106 by routing the content messages to a particular user or users, by including the content messages or media content from the content messages in a media collection accessible by one or more users 106, and so forth. Each content message may comprise media content (e.g., photos, video, audio, text, etc.) and may be processed by the server system 102 (e.g., video processing, adding media overlays, etc.).

In one embodiment, the server system 102 may receive a plurality of content messages comprising media content, such as video, from a plurality of users 106 or from a plurality of third party servers 130. The server system 102 may process each content message via the content processing server 120. For example, the content processing server 120 may receive video comprising a plurality of frames, as shown in operation 202. A video source may either be vertical or portrait (e.g., its height is greater than its width), or horizontal or landscape (e.g., its width is greater than its height).

The content processing server 120 may determine that processing should be performed on the video. In operation 204, the content processing server 120 determines that vertical cropping should be performed. The content processing server 120 may determine that processing should be performed or vertical cropping should be performed based on an indication received from a user 106, a third party server 130, or simply based on receiving the video. For example, a user 106 may interact with a display of a computing device, such as client device 110, to indicate that vertical cropping should be performed (e.g., by turning the computing device to a vertical orientation, selecting a menu item, indicating a region of interest, etc.). Some examples of user interaction include turning the device to portrait or landscape mode; tilting the device; and tapping, dragging/swiping, or pressing on the screen.

Figure 3A:
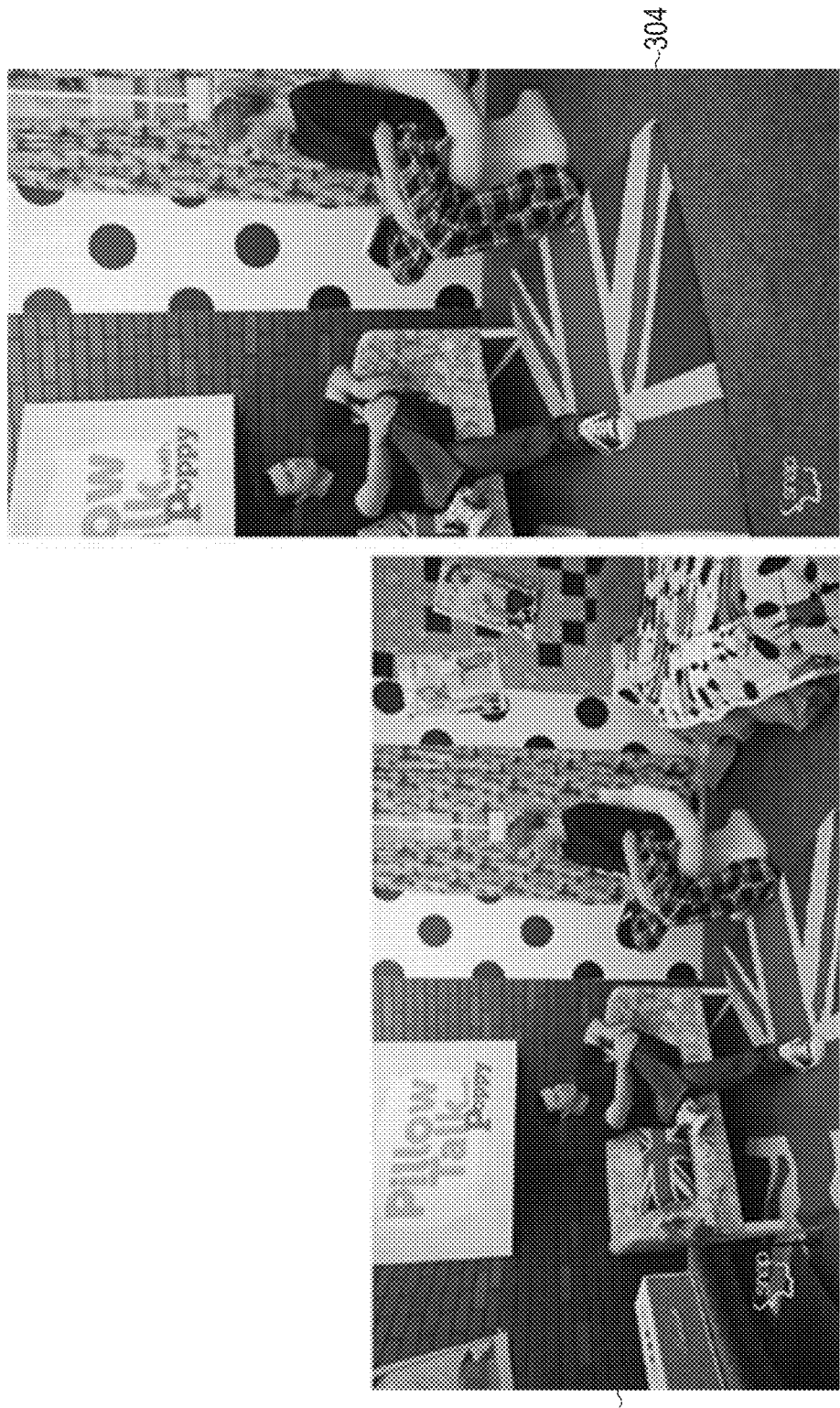
FIGS. 3A-3D show example displays, according to some example embodiments.
Figure 3B:
Figure 3C:
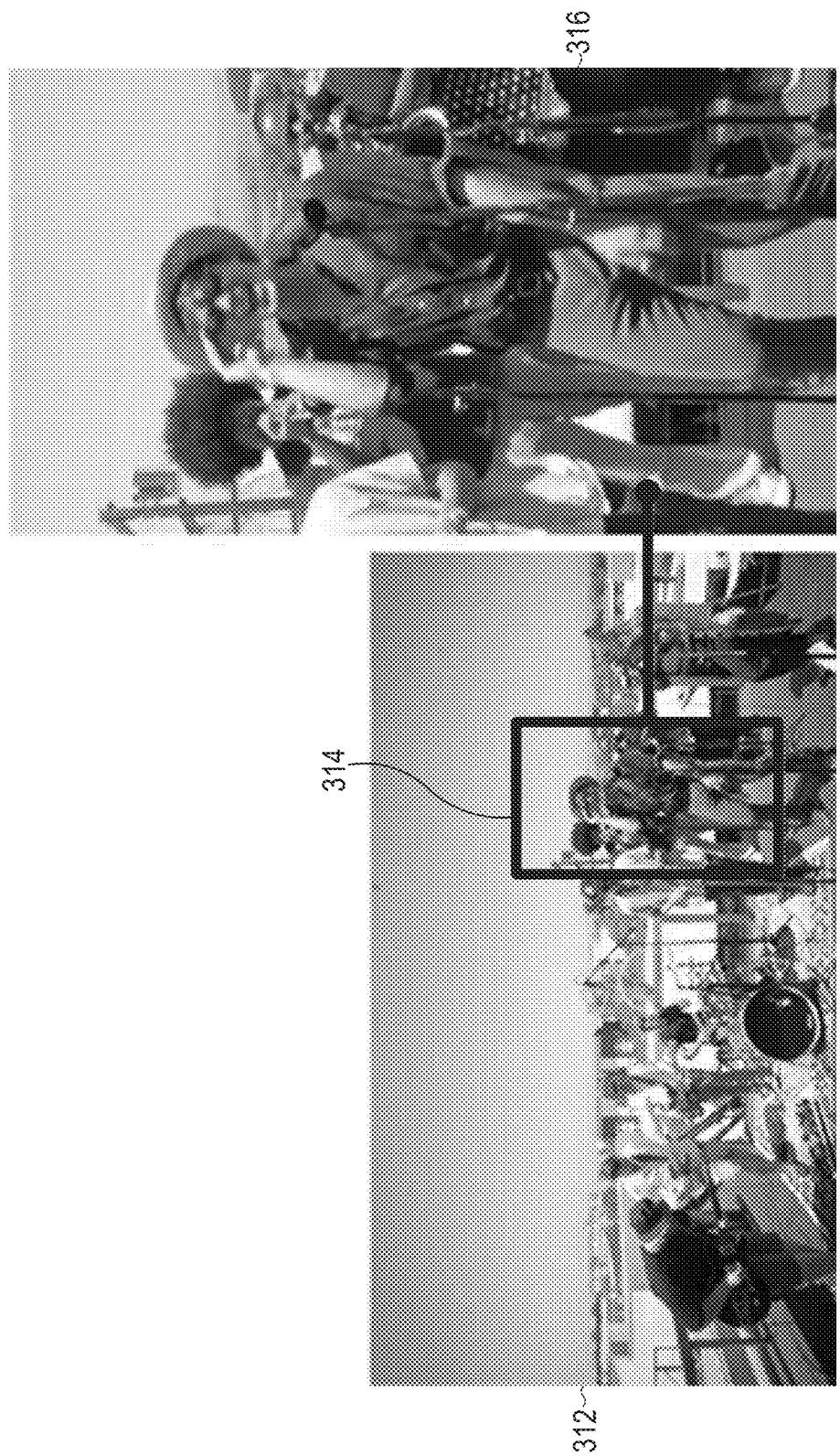
Figure 3D:
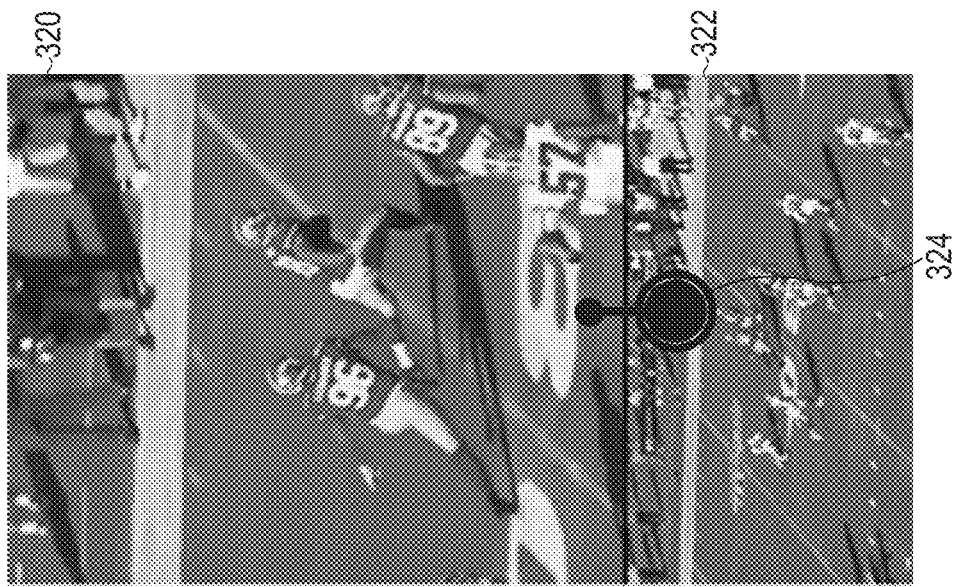
Figure 3D:
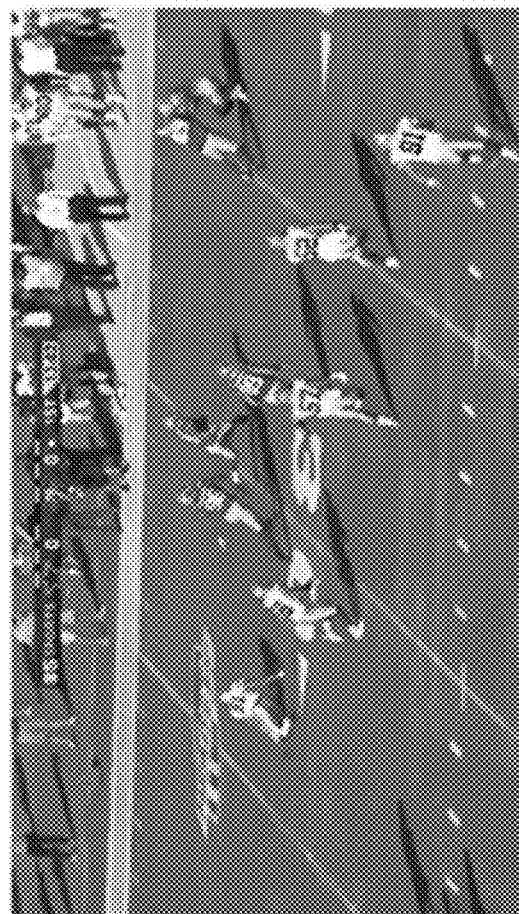

An example of a user interaction of turning a device is shown in FIG. 3A. The first display 302 indicates a first orientation of the device, and the second display 304 indicates a second orientation of the device. For example, a user viewing the video in landscape orientation may be viewing the first display 302 and when the user turns the device to a portrait orientation, the result may be the second display 304. Another example is shown in FIG. 3C with a first display 312 in landscape orientation and a second display 316 in portrait orientation. Yet another example is shown in FIG. 3D with a first display 318 in landscape orientation, and a second display comprising a split screen with a first part 320 and a second part 322. These examples are described in further detail below.

In another example, a content message or a video may be sent by a third party server 130 with a request for video processing. In yet another example, the content processing server 120 may determine that vertical processing should be performed based on characteristics of the video itself (e.g., the video was generated in landscape view and may be viewed on a device in a vertical view), or simply based on the fact that it has received the video.

Returning to FIG. 2, for each frame of the plurality of frames, the content processing server 120 processes the video. For example, the content processing server 120 analyzes each frame to determine a region of interest in each frame, at operation 206.

In one example, analyzing the frame (e.g., a first frame) to determine a region of interest may comprise analyzing the first frame to determine that there is no scene change from a second frame immediately preceding the first frame, and determining the region of interest in the first frame based on a region of interest in the second frame. For instance, if there is no scene change, the content processing server 120 may use the region of interest from the second frame as the region of interest for the first frame.

A scene change, or shot boundary detection, may be determined by comparing the first frame and second frame to classify whether the first frame contains a shot boundary based on matching a color histogram or a directional histogram. A color histogram represents the distribution of red, green and blue colors and their intensities in an image, while a directional histogram represents the distribution of image gradient directions within that image. The distances of the color histogram and directional histogram between two frames may be used to detect whether there is a scene change between the two frames. In one example, a weighted summation of the two distances may be used to compare the sum with a predefined threshold to determine whether there is a scene change. Another example is to train a classifier based on examples of neighboring frames with and without a scene change. Other methods of detecting scene changes may include a direct compare of the pixel intensity statistics, using motion estimation, and the like.

The region of interest in the first frame based on a region of interest in the second frame may be determined using a visual tracking method (e.g., compressive tracker, etc.) to automatically track the region of interest from the second frame into the first frame and into future frames. One example of a visual tracking method may be an image based tracking. For example, a target template with a collection of color values sampled at various sample points around a target (e.g., within a region of interest) may be used to track the target. When the target moves in a subsequent frame of a video, the changes may be calculated based on the template samples to identify the target by determining a matching pattern that is a closest match to the values of the target template. Tracking may also be performed based on motion estimations, optical flows, particle filters, deep learning methods, and the like. The content processing server 120 may set the region of interest based on the results of visual (or other form of) tracking.

In another example, analyzing the first frame to determine a region of interest in the first frame may comprise analyzing the first frame and determining that there is a scene change from the second frame to the first frame (as explained above regarding determining a scene change). Once a scene change is determined, the content processing server 120 may perform a saliency analysis of the first frame to determine a region of interest. For example, the content processing server 120 may generate a saliency map of the first frame that indicates the importance of each pixel at location (x, y) of the frame. The content processing server 120 may analyze the saliency map to determine a most salient window (e.g., containing the highest saliency values) of a predetermined size. The window of predetermined size may be determined by a screen size of an output device. For example, the content processing server 120 may determine the output device (e.g., client device 110 such as a mobile device) and the corresponding screen size. The content processing server 120 may determine the most salient window based on the aspect ratio of the output device screen. The content processing server 120 may project the saliency map on a horizontal axis (e.g., break down the two dimensional saliency map to a one dimensional saliency map on a horizontal dimension), so that searching for a predetermined size window with most salient content could be turned into a simpler problem of searching for a predetermined size segment. In one example, the predetermined size may be a fixed size with the same height but smaller width for a vertical cut of the frame/video. Any saliency analysis algorithms may be used, such as, spectral_residual method, ObjectnessBING, and so forth.

In another example, analyzing the first frame to determine a region of interest in the first frame may comprise detecting a user interaction with the frame and setting the region of interest based on the interaction (e.g., the location of interaction, etc.). A user interaction may include a touch input, an input via an input device (e.g., mouse, touch pad, etc.), and so forth. A user interaction may be detected by content processing server 120 by receiving an indication from a client device 110 associated with the user 106 that indicates a user interaction has occurred. For example, the client device 110 may detect the user interaction and send an indication of the user interaction to the content processing server 120.

In one example, a user 106 using a client device 110 may interact with the client device 110 to indicate a region of interest by touching the screen (e.g., pressing or tapping) on a particular object in the video, or by using an input device to point to a particular object in the video. FIG. 3B shows a first display 306 and an indication 310 of where a user 106 has touched the display or screen on the device. A second display 308 shows the resulting display based on the user interaction. In this example, the region of interest is enlarged (e.g., zoomed in) by detecting where the user is touching (e.g., pressing) the screen, or where it was last touched (e.g., tapped). This is an example of using a discrete signal (e.g., the location on the screen) to choose a region of interest. In another example the first display 306 may be in a landscape orientation and the region of interest indicated by the user interaction 310 may determine the region of interest for cropping a vertical video to result in a second display in a vertical orientation (e.g., either zoomed in, or not zoomed in).

In another example, a user 106 using a client device 110 may interact with the client device 110 to indicate a region of interest by touching and drawing an area of interest (e.g., drawing a circle, square, rectangle, or other shape around an object or area of interest), by using an input device to draw an area of interest, and the like. In one example, a user can click and hold a mouse and the video will pause allowing the user to draw a region of interest. In another example, the user may touch an area of interest on a display of the computing device (e.g., client device 110), swipe through an area of interest, and so forth. FIG. 3C shows a first display 312 and an indication 314 of where a user 106 has touched the display or screen on the device. A second display 316 shows the resulting display based on the user interaction. In this example, the client device 110 (e.g., via an application 114) may sense the change in the device's tilt angle and the user can move the region of interest by swiping across the screen or drawing a shape around the region of interest. This is an example of using a continuous signal (e.g., the device's orientation or tilt angle, or a swiping motion, etc.) to select the region of interest.

FIG. 3D shows an example of using a combination of a device orientation and a split screen that allows a user to choose a region of interest. For example, a first display 318 may be in a landscape orientation. A second display may comprise a split screen with a first part 320 and a second part 322. The first part 320 may display a region of interest. The second part 322 may show the full video (e.g., a scaled down version of the landscape orientation content). A user may select or change the region of interest by user interaction 324 (e.g., pressing the display, using an input device to select the region of interest, etc.).

Returning to FIG. 2, in operation 208, the content processing server 120 crops each fame based on the region of interest in each frame. For example, the content processing server 120 crops the first frame based on the region of interest in the frame to produce a vertically cropped frame for the video.

In operation 210, the content processing server 120 determines a frame immediately preceding each frame. For example, the content processing server 120 determines a second frame immediately preceding the first frame. The content processing server 120 smooths a trajectory from the second frame to the vertically cropped frame, as shown in operation 212. In this way the output will be a smoothly changing vertical video cropping so that it plays back without jittering. For real-time cropping, recursive filtering for the cropping locations may be used.

The vertically cropped frame may be displayed to a user (e.g., instead of the first frame). The content processing server 120 may store the vertically cropped frame for the video. The vertically cropped frame may be provided to a user as part of the video immediately or at some later time. For example, the method described in FIG. 2 may be performed in advance on video received by the content processing server 120 (e.g., on professionally generated video, on advertisements, on user generated video, etc.) or may be done real-time, or substantially real-time, as the video is being provided to the user (e.g., while the user is viewing the video).

Moreover, the method described in FIG. 2 is described as being performed by the content processing server 120. In other embodiments, the method may be performed by other computing devices (e.g., the client device 110), or by a combination of computing devices (e.g., the client device 110 and the content processing server 120).

Furthermore, the above example describes producing a vertically cropped frame for a video. Other embodiments could produce a horizontally cropped frame. For example, a source of a video frame could be vertical or horizontal and the system could produce a vertically cropped frame for the video frame or a horizontally cropped frame for the video frame, or both.

An example algorithm pseudo code according to an example embodiment may be as follows:

```
shot_start = 0;
if auto start
    ROI[0] = Find_ROI_SA( SA(f[i]) )
else
    wait for UserInput
    ROI[0] = Find_ROI_Interaction(UserInput)
for each frames f[i], i=1, 2, 3, ..., n, ...
    shot_boundary = SBD(f[i-1], f[i]) // detect shot boundary
    if there is user interaction
        VVC(ROI[shot_start:i-1]) // crop a vertical cut for previous shot
        shot_start = i;
        ROI[i] = Find_ROI_Interaction(UserInput)
    else
        if shot_boundary is true
            VVC(ROI[shot_start:i-1]) // crop a vertical cut for previous shot
            shot_start = i;
            ROI[i] = Find_ROI_SA( SA(f[i]) )
        else
            ROI[i] = Find_ROI_Tracking(f[i-1], ROI[i-1], f[i])
VVC(ROI[shot_start:n]) // Crop the last shot
```

As explained above, embodiments described herein provide for the ability for a user to interact with a video to choose which region of the video to display (e.g., the region of interest). In other embodiments, video content may be delivered to a user's device (e.g., client device 110) through multiple simultaneous video sources. Images may be selected from these video sources and combined for display on the user's device. Which sources are selected, and how they are combined, may also be controlled through the user's interaction with the device.

Figure 5:
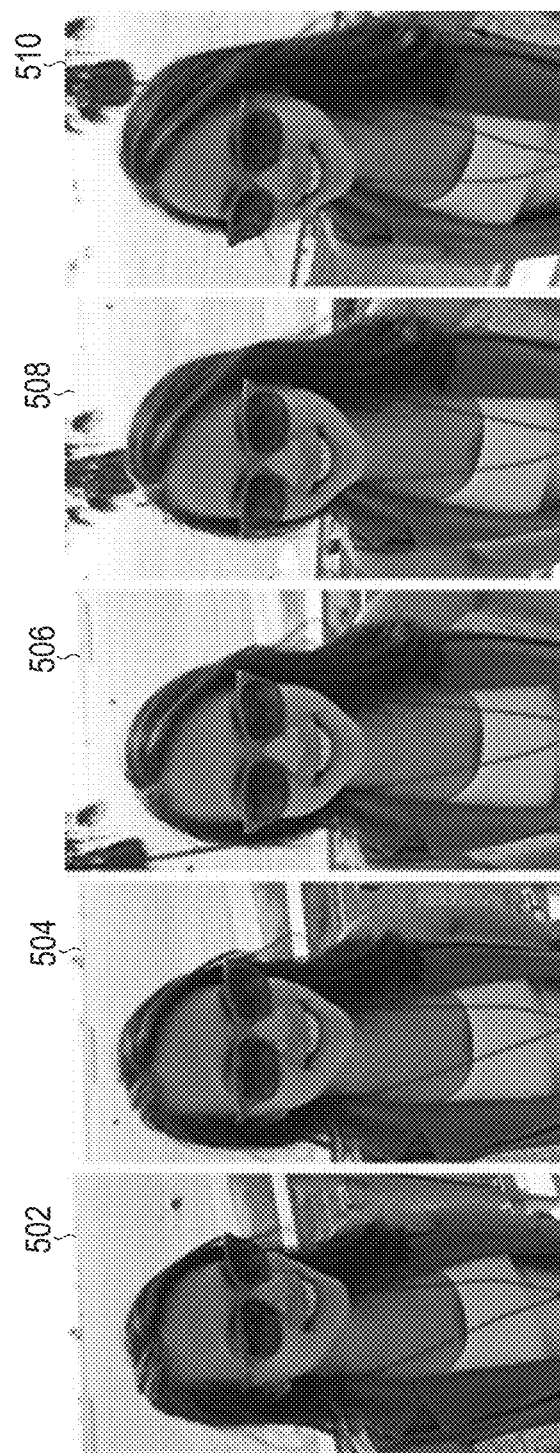
FIGS. 5-6 show example displays, according to some example embodiments.
Figure 6:
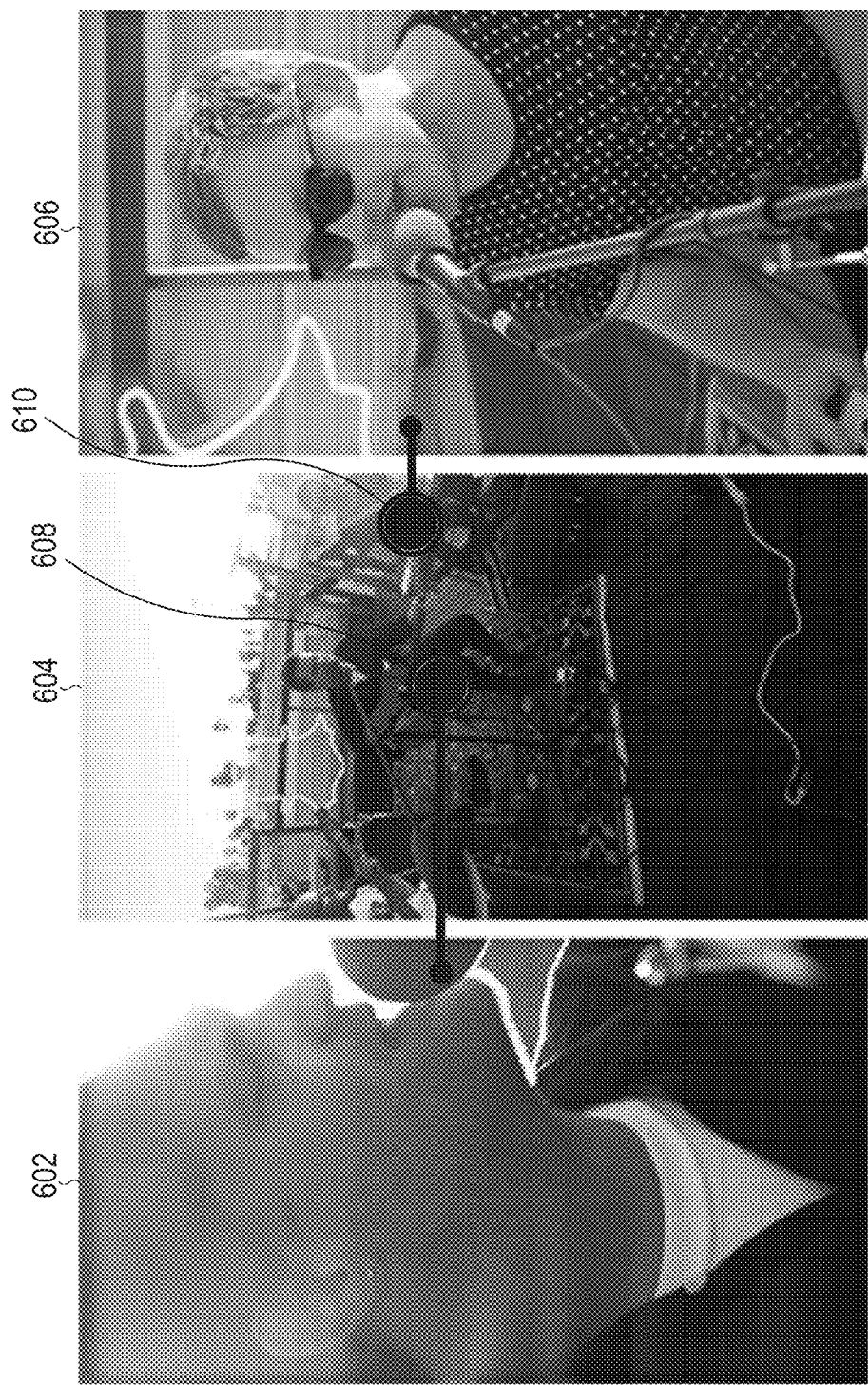

FIGS. 3A-3D and FIGS. 5-6 illustrate different ways of presenting video content, with examples of how the presentation may be controlled through the user's interaction with a computing device. FIGS. 3A-3D have been described above as examples of how a user may choose to display a region of interest of one video source to display. FIG. 3A and FIGS. 5-6 show examples of how a user may choose to display one video source chosen from multiple video sources. Embodiments described herein allow a user to select one video source from multiple video sources to be displayed to the user at a time. This gives the user control over which video source is selected and produces a range of new interactive viewing experiences.

For example, multiple video sources may be created (e.g., using multiple cameras) for a particular event, such as a concert, interview, show, sporting event, and so forth. Based on a user interaction with the device (e.g., turning or tilting the device, selecting an area of the video, etc.) in which the user is viewing the video, he may view a different video source (e.g., landscape view, portrait view, close up of a particular region or object, various views of a particular region or object, etc.).

One example embodiment allows a user to turn to select a video source from multiple video sources. An example of this embodiment is shown in FIG. 3A (which is also described above with respect to a single video source). FIG. 3A illustrates a display 302 when a computing device is oriented in a landscape or horizontal orientation, and a display 304 when a computing device is oriented in a portrait or vertical orientation. The computing device may sense the orientation in which the device is being held by the user (e.g., portrait, landscape left, landscape right, upside-down portrait). Each orientation may be associated with a different video source. The computing device (e.g., via an application on the computing device) may select the appropriate video source to display in real-time by sensing the current device orientation. This is an example of using a discrete signal (e.g., the device orientation) to select from a set of video sources.

Another example embodiment allows a user to tilt to select or swipe to select a video source from multiple video sources. An example of this embodiment is shown in FIG. 5. The device may sense the angle (e.g., tilt) at which it is being held by a user. The device may also detect if the user's finger has moved while touching the screen (e.g., swiping). When each video source in a sequence is associated with a range of tilt angles, a mobile app can select the appropriate video source to display in real-time by sending the current device tilt (as shown in displays 502-510). Similarly, the user can choose to view the previous and next video source in the sequence by swiping left and right on the device. This is an example of using a continuous signal (e.g., the device's tilt angle) or a discrete signal (e.g., a swipe interaction) to select from a sequence of video sources. In the example in FIG. 5, a different video source is displayed when the user tilts the device to the left and right. Each video source was captured from a different camera so that tilting the device creates a "bullet time" effect for the user.

Figure 4:
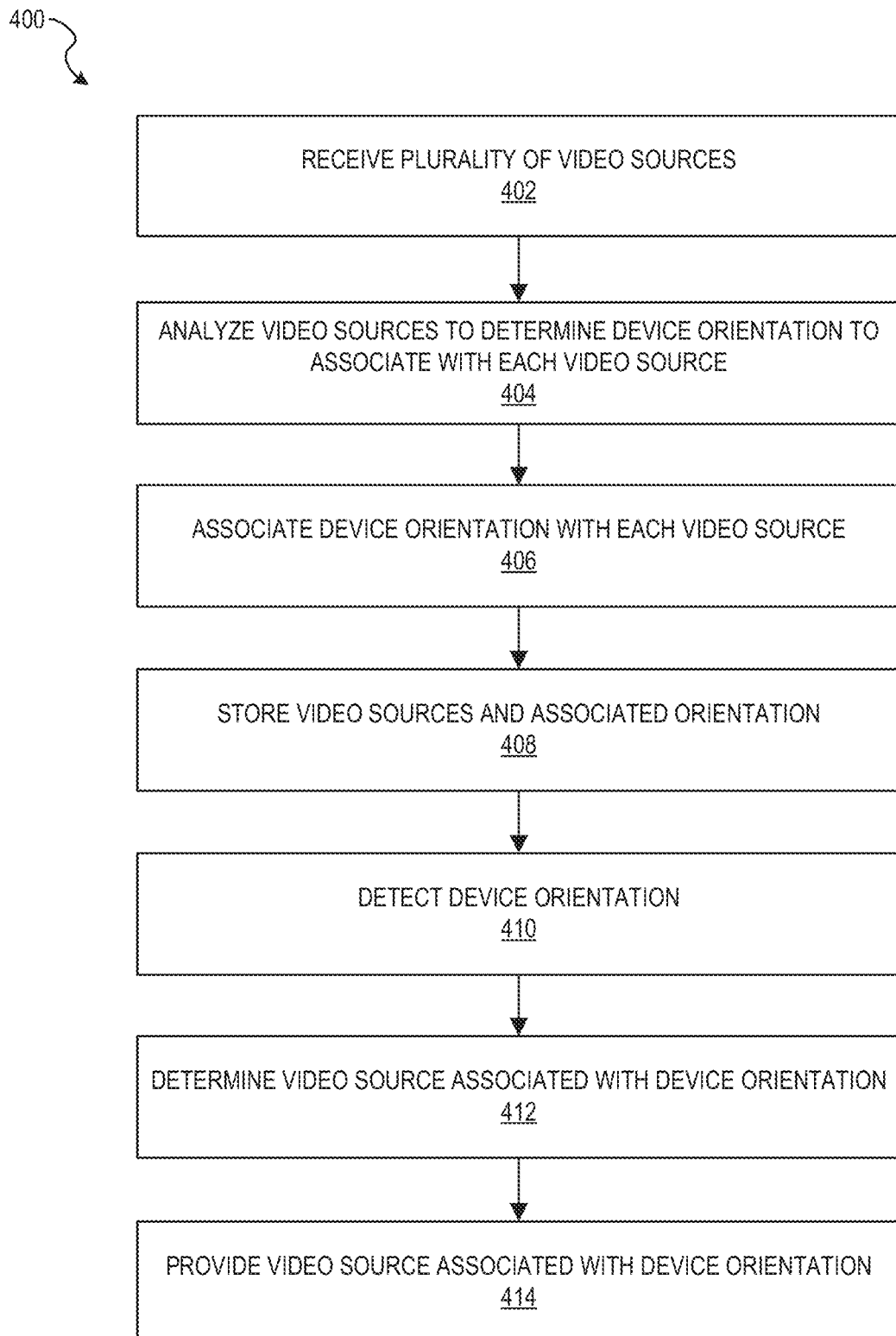
FIG. 4 is a flowchart illustrating aspects of a method, according to some example embodiments, for detecting device orientation and providing an associated video source.

FIG. 4 is a flow chart illustrating aspects of a method 400, according to some example embodiments, for detecting device orientation and providing an associated video source. For illustrative purposes, method 400 is described with respect to the networked system 100 of FIG. 1 and example display in FIG. 3A. It is to be understood that method 400 may be practiced with other system configurations in other embodiments.

In one example, a video of an event may be shot in a landscape view and a portrait view. A first video source for the landscape view and a second video source for the portrait view may be provided (e.g., via one or more third party servers 130, one or more client devices 110, or other sources) to the server system 102. The server system 102 may receive the plurality of video sources, as shown in operation 402. In this example, the server system 102 receives the first video source for the landscape view and the second video source for the portrait view.

In operation 404, the server system 102 (e.g., via content processing server 120) may analyze each of the plurality of video sources to determine which orientation(s) to associated with each source. For example, the content processing server may analyze the first video source and the second video source to determine which orientation(s) to associate with each source. The content processing server 120 may determine that the first video source is a landscape view and thus should be associated with a first device orientation (e.g., a landscape orientation). The content processing server 120 may determine that the second video source is a portrait view and thus should be associated with a second device orientation (e.g., a portrait view).

In another example, the content processing server 120 may determine an angle of the video or a subject (e.g., region or object) in the video to determine the device orientation (e.g., the angle of the device for which the video source will be presented). In this way the content processing server 120 may determine the device orientation is a tilt angle based on the angle of the subject of the video. For example, if there are three views of a particular subject of a video (e.g., a left view, a middle view, and a right view), the device orientation may be initialized to the middle view, to initially display the middle view to a user. When the device is tilted to left, the left view may be shown, and when the device is tilted to the right, the right view may be shown. The tilt angle may be determined by a gyro sensor on the device or other technology or mechanism for determining a tilt angle.

The content processing server 120 associates at least one device orientation with each video source, as shown in operation 406. In operation 408, the content processing server 120 stores the video sources and associated orientation. For example, the content processing server 120 may store the video sources and associated orientation in one or more databases 126.

A user 106 using a computing device (e.g., client device 110) may begin viewing a video. At operation 410, the server system 102 may detect the device orientation of the client device 110 based on a signal received from the computing device. For example, the client device 110 may detect a device orientation (e.g., the orientation of the computing device with which the user is viewing the video) and send a request to the server system 102 for a video source associated with the device orientation. At operation 412, the server system 102 determines a video source associated with the device orientation. For example, the server system 102 may access one or more databases 126 to look up the video and video source associated with the device orientation. At operation 414, the server system 102 provides the video source associated with the device orientation to the client device 110. The video source may be provided to the user for viewing on the client device 110.

FIG. 6 illustrates an example where regions or objects of the device's display or screen are associated with a video source. For example, a user may be viewing a first display 604. The client device 110 (e.g., via an application 114) may select the appropriate video source to display (e.g., in real-time or substantially real-time) by sensing where the user is touching (e.g., pressing) or where the user last touched (e.g., tapped). This is another example of a discrete signal (e.g., regions of the device's screen) to select from a set of video sources. For example, a user interaction 610 may result in a second display 606 and a user interaction 608 may result in a third display 602. Each video source may be captured from a different camera, thereby providing a unique perspective.

Figure 7:
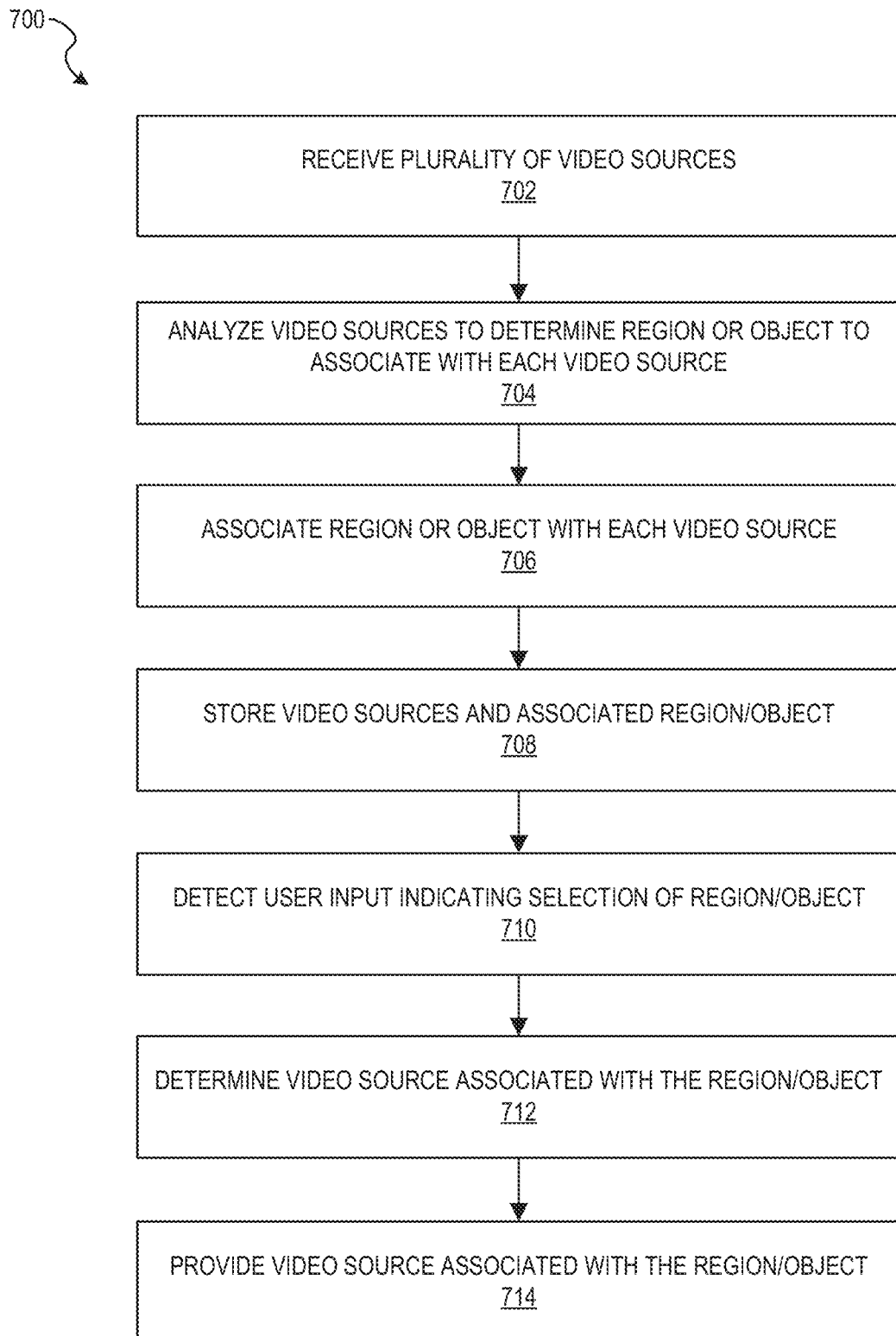
FIG. 7 is a flowchart illustrating aspects of a method, according to some example embodiments, for detecting a user input and providing an associated video source.

FIG. 7 is a flow chart illustrating aspects of a method 700, according to some example embodiments, for detecting a user input in a region of a display and providing an associated video source. For illustrative purposes, method 700 is described with respect to the networked system 100 of FIG.

1 and example display in FIG. 6. It is to be understood that method 700 may be practiced with other system configurations in other embodiments.

In operation 702, the server system 102 may receive a plurality of video sources. The server system 102 may determine various regions and/or objects in the video sources that may correspond to a particular video source. In operation 704, the server system 102 (e.g., via content processing server 120) may analyze each of the plurality of video sources to determine which region or object to associate with each source. In one example, a screen may be divided into different regions with each region corresponding to a particular video source. When a user selects a location on the screen (e.g., pressing on the screen, using an input device to select a location on the screen, etc.), the server computer may determine which region the user has selected and present the corresponding video source.

Using a simple example, there may be three video sources. As shown in FIG. 6, a first video source 604 may show all the musicians playing a concert, a second video source 602 may show a first musician, and a third video source 606 may show a second musician. The content processing server may analyze the first video source to determine which region or object to associate with each video source. Accordingly, the content processing server 120 associates at least one region or object (e.g., the first musician, the second musician, the entire stage with all of the musicians) with each video source, as shown in operation 706.

In operation 708, the content processing server 120 stores the video sources and associated region or object. For example, the content processing server 120 may store the video sources and associated region or object in one or more databases 126.

A user 106 using a computing device (e.g., client device 110) may begin viewing a video. At operation 710, the server system 102 may detect user input (e.g., pressing or tapping on a display (e.g., display screen) of the client device 110) based on a signal received from the client device 110. For example, the client device 110 may detect a user input and send a request to the server system 102 for a video source associated with the user input. The request may include the user input, the location of the user input on the display or in the video, a time stamp for the video, or other data. At operation 712, the server system 102 determines a video source associated with the region or object nearest the location of the user input. For example, the server system 102 may determine a region or object to which the user input corresponds, and access one or more databases 126 to look up the video and video source associated with the region or object. At operation 714, the server system 102 provides the video source associated with the region or object to the client device 110. The video source may be provided to the user for viewing on the client device 110.

Figure 8:
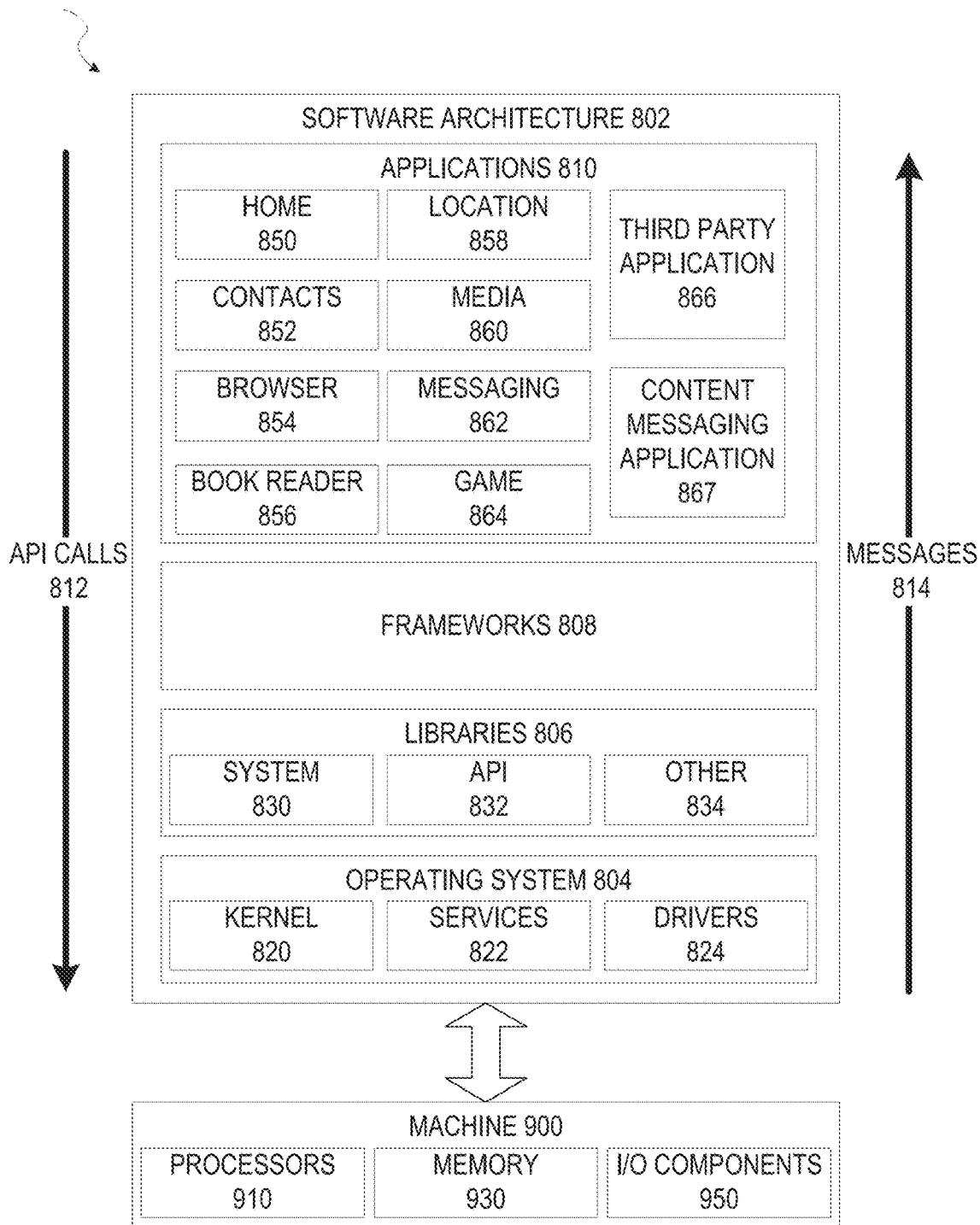
FIG. 8 is a block diagram illustrating an example of a software architecture that may be installed on a machine, according to some example embodiments.

FIG. 8 is a block diagram 800 illustrating software architecture 802, which can be installed on any one or more of the devices described above. For example, in various embodiments, client devices 110 and server systems 130, 102, 122, and 124 may be implemented using some or all of the elements of software architecture 802. FIG. 8 is merely a non-limiting example of a software architecture, and it will be appreciated that many other architectures can be implemented to facilitate the functionality described herein. In various embodiments, the software architecture 802 is implemented by hardware such as machine 900 of FIG. 8 that includes processors 910, memory 930, and I/O components 950. In this example, the software architecture 802 can be conceptualized as a stack of layers where each layer may provide a particular functionality. For example, the software architecture 802 includes layers such as an operating system 804, libraries 806, frameworks 808, and applications 810. Operationally, the applications 810 invoke application programming interface (API) calls 812 through the software stack and receive messages 814 in response to the API calls 812, consistent with some embodiments.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 (e.g., C standard library) that can provide functions such as memory allocation functions, string manipulation functions, mathematic functions, and the like. In addition, the libraries 806 can include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 806 can also include a wide variety of other libraries 834 to provide many other APIs to the applications 810.

The frameworks 808 provide a high-level common infrastructure that can be utilized by the applications 810, according to some embodiments. For example, the frameworks 808 provide various graphic user interface (GUI) functions, high-level resource management, high-level location services, and so forth. The frameworks 808 can provide a broad spectrum of other APIs that can be utilized by the applications 810, some of which may be specific to a particular operating system 804 or platform.

In an example embodiment, the applications 810 include a home application 850, a contacts application 852, a browser application 854, a book reader application 856, a location application 858, a media application 860, a messaging application 862, a game application 864, and a broad assortment of other applications such as third party applications 866. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third party application 866 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 866 can invoke the API calls 812 provided by the operating system 804 to facilitate functionality described herein.

Some embodiments may particularly include a content messaging application 867. In certain embodiments, this may be a stand-alone application that operates to manage communications with a server system such as third party servers 130 or server system 102. In other embodiments, this functionality may be integrated with another application such as a messaging application 862, media application 860, or another such application. Content messaging application 867 may allow a user to capture media content (e.g., photos, video, etc.) and review and request content messages and media content provided by other users and third party sources. The content messaging application may provide the capability for a user to capture media content and input data related to media content or content messages via a touch interface, keyboard, or using a camera device of machine 900, communication with a server system via I/O components 950, and receipt and storage of content messages and media content in memory 930. Presentation of media content and user inputs associated with media content may be managed by content messaging application 867 using different frameworks 808, library 806 elements, or operating system 804 elements operating on a machine 900.

Figure 9:
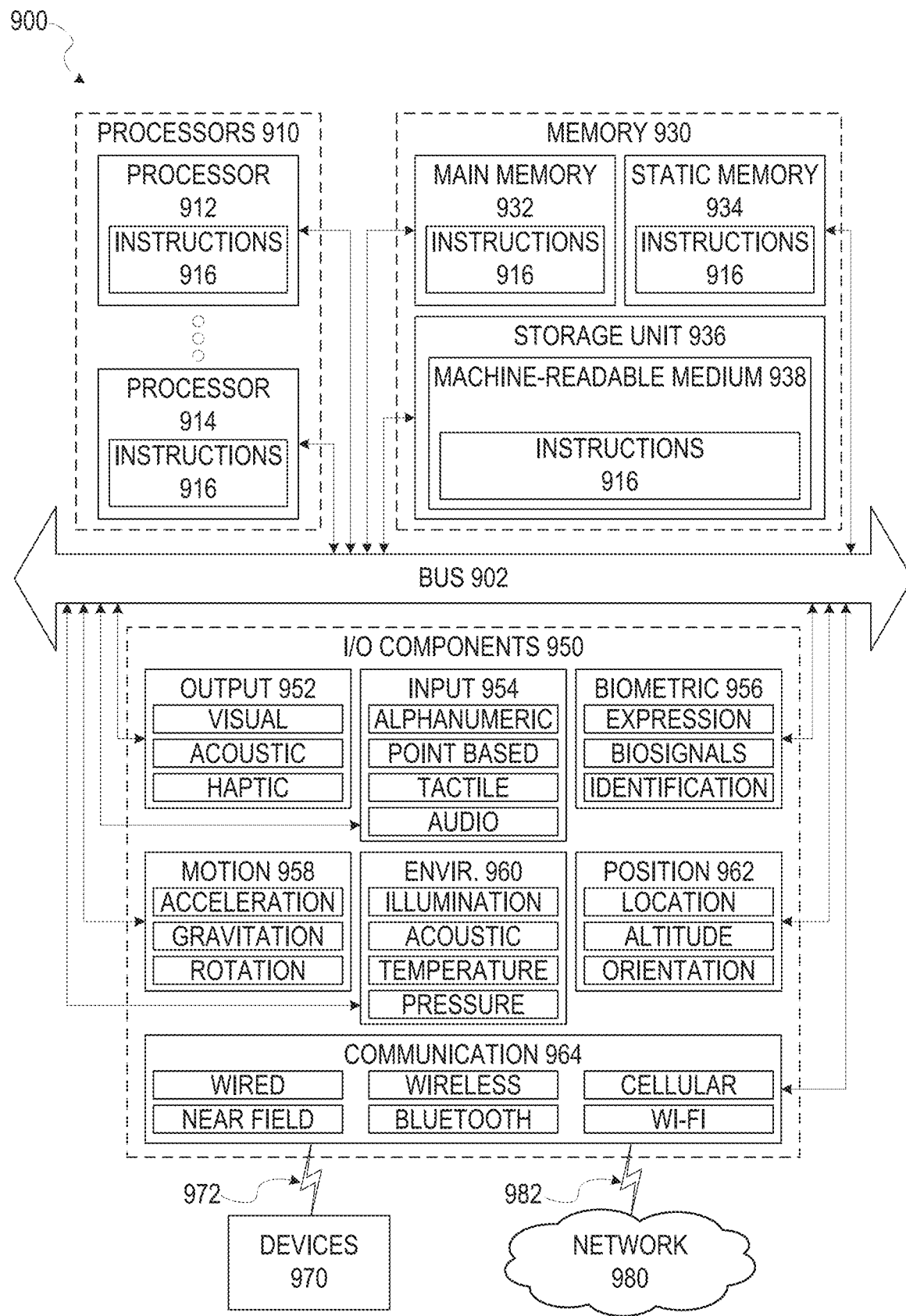
FIG. 9 illustrates a diagrammatic representation of a machine, in the form of a computer system, within which a set of instructions may be executed for causing the machine to perform any one or more of the methodologies discussed herein, according to an example embodiment.

FIG. 9 is a block diagram illustrating components of a machine 900, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application 810, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 130, 102, 120, 122, 124, and the like or a client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 9 shows multiple processors 910, the machine 900 may include a single processor 910 with a single core, a single processor 910 with multiple cores (e.g., a multi-core processor 910), multiple processors 912, 914 with a single core, multiple processors 910, 912 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3 G, fourth generation wireless (4 G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    detecting, by a computing device, a user touch on a display screen of the computing device during display of a video comprising a sequence of frames;
    detecting, by the computing device, a location of the user touch on the display screen of the computing device;
    determining in a current frame of the sequence of frames of the displayed video, a region of interest indicated by the location of the user touch on the display screen of the computing device;
    detecting that the computing device has been moved from a first angle or orientation to a second angle or orientation after detection of the user touch on the display screen of the computing device;
    for each frame of the sequence of frames after the current frame, performing operations comprising:
        cropping, by the computing device, the frame to generate a cropped frame comprising a portion of the frame including the region of interest in the frame and based on the second angle or orientation;
        enlarging the cropped frame based on a display size corresponding to the second angle or orientation of the computing device during display of the video; and
        causing the enlarged cropped frame to replace the frame such that the enlarged cropped frame is displayed in the sequence of frames of the video on the display of the computing device instead of the frame.

2. The method of claim 1, wherein before cropping the frame to generate a cropped frame comprising a portion of the frame including the region of interest in the frame, the method comprises:
    analyzing the frame to determine whether there is a scene change from a previous frame immediately preceding the frame;
    based on determining there is no scene change from the previous frame, using a region of interest of the previous frame as a region of interest for the frame;
    based on determining there is a scene change from the previous frame, determining a region of interest for the frame based a saliency analysis of the frame;
    wherein using the region of interest of the previous frame as the region of interest for the frame comprises using a visual tracking method to determine the region of interest from the previous frame.

3. The method of claim 2, wherein analyzing the frame to determine whether there is a scene change is based on matching a color histogram or matching a directional histogram.

4. The method of claim 2, wherein using the regions of interest of the previous frame as the region of interest for the frame comprises using a tracking method comprising at least one of an image based tracking method, motion estimations, optical flows, particle filters, and deep learning methods.

5. The method of claim 2, wherein determining the region of interest based on a saliency analysis further comprises:
    generating a saliency map of the frame;
    projecting the saliency map on a horizontal axis;
    analyzing the saliency map to determine a most salient window of a predetermined size; and
    setting the region of interest to the most salient window of the predetermined size.

6. The method of claim 5, wherein determining the most salient window of a predetermined size is based on an aspect ratio of the display of the computing device.

7. The method of claim 1, wherein the enlarged cropped frame is displayed on the display of the computing device as a first part of a split screen and the frame is displayed as a second part of the split screen, wherein first part of the split screen is larger than the second part of the split screen.

8. The method of claim 1, further comprising:
smoothing a trajectory from a previous frame to the enlarged cropped frame before causing the enlarged cropped frame to be displayed.

9. The method of claim 1, further comprising:
splitting the display of the computing device into a first part and a second part based on the second angle or orientation of the computing device during display of the video;
causing the enlarged cropped frame to be displayed in the first part of the display of the computing device; and
causing an original frame to be displayed in the second part of the display of the computing device, the original frame comprising the frame from which the enlarged cropped frame was generated.

10. The method of claim 1, further comprising:
splitting the display of the computing device into a first part and a second part based on the second angle or orientation of the computing device during display of the video;
causing the enlarged cropped frame to be displayed in the first part of the display of the computing device; and
causing the video comprising the sequence of frames to be displayed in the second part of the display of the computing device.

11. The method of claim 10, further comprising:
detecting a second user touch on the second part of the display of the computing device during display of the sequence of frames, the user touch detected during display of a second current frame;
determining that the second user touch indicates a changed region of interest in the second current frame of the sequence of frames being displayed in the second part of the display of the computing device;
for each frame of the sequence of frames after the second current frame, performing operations comprising:
cropping the frame to generate a cropped frame comprising a portion of the frame including the region of interest in the frame;
enlarging the cropped frame based on the display size corresponding to first part of the display of the computing device during display of the video; and
causing the enlarged cropped frame to replace the frame such that the enlarged cropped frame is displayed in the sequence of frames of the video in the first part of the display of the computing device instead of the frame.

12. A computing device comprising:
a display;
at least one processor; and
a non-transitory computer readable medium coupled with the processor, the computer readable medium comprising instructions stored thereon that are executable by the at least one processor to cause a computing device to perform operations comprising:
detecting a user touch on a display screen of the computing device during display of a video comprising a sequence of frames;
detecting a location of the user touch on the display screen of the computing device;
determining in a current frame of the sequence of frames of the displayed video, a region of interest indicated by the location of the user touch on the display screen of the computing device;
detecting that the computing device has been moved from a first angle or orientation to a second angle or orientation after detection of the user touch on the display screen of the computing device;
for each frame of the sequence of frames after the current frame, performing operations comprising:
cropping the frame to generate a cropped frame comprising a portion of the frame including the region of interest in the frame and based on the second angle or orientation;
enlarging the cropped frame based on a display size corresponding to the second angle or orientation of the computing device during display of the video; and
causing the enlarged cropped frame to replace the frame such that the enlarged cropped frame is displayed in the sequence of frames of the video on the display of the computing device instead of the frame.

13. The computing device of claim 12, wherein the enlarged cropped frame is displayed on the display of the computing device as a first part of a split screen and the frame is displayed as a second part of the split screen, wherein first part of the split screen is larger than the second part of the split screen.

14. The computing device of claim 12, the operations further comprising:
smoothing a trajectory from a previous frame to the enlarged cropped frame before causing the enlarged cropped frame to be displayed.

15. The computing device of claim 12, the operations further comprising:
splitting the display of the computing device into a first part and a second part based on the second angle or orientation;
causing the enlarged cropped frame to be displayed in the first part of the display of the computing device; and
causing an original frame to be displayed in the second part of the display of the computing device, the original frame comprising the frame from which the enlarged cropped frame was generated.

16. The computing device of claim 12, the operations further comprising:
splitting the display of the computing device into a first part and a second part based on the second angle or orientation of the computing device during display of the video;
causing the enlarged cropped frame to be displayed in the first part of the display of the computing device; and
causing the video comprising the sequence of frames to be displayed in the second part of the display of the computing device.

17. The computing device of claim 12, the operations further comprising:
detecting a second user touch on the second part of the display of the computing device during display of the sequence of frames, the user touch detected during display of a second current frame;
determining that the second user touch indicates a changed region of interest in the second current frame of the sequence of frames being displayed in the second part of the display of the computing device;
for each frame of the sequence of frames after the second current frame, performing operations comprising:

cropping the frame to generate a cropped frame comprising a portion of the frame including the region of interest in the frame;

enlarging the cropped frame based on the display size corresponding to first part of the display of the computing device during display of the video; and causing the enlarged cropped frame to replace the frame such that the enlarged cropped frame is displayed in the sequence of frames of the video in the first part of the display of the computing device instead of the frame.

18. A non-transitory computer readable medium comprising instructions stored thereon that are executable by at least one processor to cause a computing device to perform operations comprising:

detecting a user touch on a display screen of the computing device during display of a video comprising a sequence of frames;

detecting a location of the user touch on the display screen of the computing device;

determining in a current frame of the sequence of frames of the displayed video, a region of interest indicated by the location of the user touch on the display screen of the computing device;

detecting that the computing device has been moved from a first angle or orientation to a second angle or orientation after detection of the user touch on the display screen of the computing device;

for each frame of the sequence of frames after the current frame, performing operations comprising:

cropping the frame to generate a cropped frame comprising a portion of the frame including the region of interest in the frame and based on the second angle or orientation;

enlarging the cropped frame based on a display size corresponding to the second angle or orientation of the computing device during display of the video; and causing the enlarged cropped frame to replace the frame such that the enlarged cropped frame is displayed in the sequence of frames of the video on the display of the computing device instead of the frame.

19. The method of claim 1, wherein detecting that the computing device has been moved from the first angle or orientation to the second angle or orientation after detection of the user touch on the display screen of the computing device comprises:

detecting that the computing device has been moved from a landscape orientation to a portrait orientation; and wherein cropping the frame to generate the cropped frame comprising a portion of the frame including the region of interest in the frame and based on the second angle or orientation comprises cropping the frame in a vertical orientation.

20. The method of claim 19, wherein enlarging the cropped frame based on the display size corresponding to the second angle or orientation of the computing device during display of the video comprises:

enlarging the cropped frame based on the portrait orientation; and wherein causing the enlarged cropped frame to replace the frame such that the enlarged cropped frame is displayed in the sequence of frames of the video on the display of the computing device instead of the frame comprises causing the enlarged cropped frame to display in vertical orientation.

\* \* \* \* \*